United States Patent [19]

Wroblewski

[11] 4,316,080
[45] Feb. 16, 1982

[54] TEMPERATURE CONTROL DEVICES

[76] Inventor: Theodore Wroblewski, 46 Reservoir Dr., Danvers, Mass. 01923

[21] Appl. No.: 125,799

[22] Filed: Feb. 29, 1980

[51] Int. Cl.³ .............................................. H05B 1/02
[52] U.S. Cl. .................................... 219/505; 219/494; 219/501; 219/504; 338/22 R; 338/23
[58] Field of Search ............... 219/490, 494, 501, 504, 219/505, 210, 435; 307/117; 338/22 R, 23

[56] References Cited

U.S. PATENT DOCUMENTS

| | | | |
|---|---|---|---|
| 3,299,345 | 1/1967 | Gambill | 219/499 |
| 3,584,196 | 6/1971 | Kurakawa et al. | 219/435 |
| 3,651,308 | 3/1972 | Kurakawa et al. | 219/505 |
| 3,681,569 | 8/1972 | Schwarz | 219/501 |
| 3,798,413 | 3/1974 | Kahn | 219/210 |
| 3,826,924 | 7/1974 | Plough et al. | 219/505 |
| 3,962,559 | 6/1976 | Drda et al. | 219/210 |
| 4,024,427 | 5/1977 | Belhomme | 338/23 |
| 4,045,763 | 8/1977 | Miyamoto et al. | 219/504 |

FOREIGN PATENT DOCUMENTS

| | | | |
|---|---|---|---|
| 2041206 | 2/1972 | Fed. Rep. of Germany | 219/505 |
| 1318198 | 5/1973 | United Kingdom | 219/505 |

Primary Examiner—Gene Z. Rubinson
Assistant Examiner—M. Paschall
Attorney, Agent, or Firm—Cesari and McKenna

[57] ABSTRACT

A temperature-controlling circuit including a heating element, a portion of which is shunted by a proportional PTC thermistor having a low rate of charge of resistance with increasing temperature that controls current to the shunted and unshunted portion of the heating element to provide a proportional control of temperature. Additional embodiments are disclosed in which additional circuit elements are employed to further control current through the heating element, and in which a second thermistor connected in series with the shunted portion of the heating element accommodates wide voltage swings.

8 Claims, 5 Drawing Figures

TEMPERATURE CONTROL DEVICES

BACKGROUND OF THE INVENTION

This invention relates generally to the field of electric heating devices, and more particularly to such devices having arrangements for controlling the temperatures thereof.

DESCRIPTION OF THE PRIOR ART

Various arrangements are known for controlling the temperatures of electric heaters, including the use of such temperature-responsive devices as bimetallic switches and positive- or negative-temperature-coefficient resistance devices. Such devices are used in the prior art to switch the electrical current in a controlled heating element on and off to control temperature. When such a temperature-responsive device senses a temperature below a preselected cut-off or switch temperature, it permits power to flow to the heater and the temperature to thereby increase. When the temperature rises above the switch temperature, however, the device rapidly and substantially reduces the power to the heater, or shuts it off completely, thereby eliminating the heater's ability to generate heat. After the temperature falls again below the switch temperature, the power is permitted to flow again and the heater again supplies heat.

Positive-temperature-coefficient (PTC) thermistors having a high rate of change of resistance with increasing temperature above the switch temperature, or "switch" thermistors, are used as temperature control devices in prior art circuits. Heretofore, it has been the practice to discard thermistors having a low rate of change of resistance against temperature. Consequently, prior art thermistor-controlled circuits operate in a manner similar to circuits controlled by conventional thermostats with mechanical bimetallic strips that have been used for so many years. That is, in such thermistor controlled circuits the thermistor effectively operates as a switch.

However, after these PTC thermistors switch to reduce the power to the heater, self-heating in the thermistors themselves can prevent them from switching the current back on even after the heating elements they are controlling have cooled below the thermistors' switch temperatures. Specifically, when the temperature increases above the PTC thermistor's switch temperature, and the resistance of the PTC thermistor increases rapidly, thereby cutting off most of the current to the heating element in series therewith, virtually all of the power supply voltage is across the thermistor. The current through the thermistor, though small, generates sufficient heat in the thermistor itself to maintain its temperature above the switch temperature.

Thus, even though the temperature to be controlled, external to the PTC thermistor, has decreased, the internal temperature of the PTC thermistor remains high, and the thermistor remains in its high resistance, "off", state. To reduce the internal temperature of the thermistor below its switch temperature, it has to be disconnected from the power supply to permit it to cool before the power to the heater can be switched on again.

Prior art PTC thermistor-controlled heaters also have other problems that are typical of thermostatically-controlled heaters, including temperature fluctuations and temperature overshoot, that occur even if self-heating does not arise.

SUMMARY OF THE INVENTION

It is therefore an object of this invention to provide a new and improved electric heating arrangement including means for controlling a temperature at an elevated level.

It is another object of the invention to provide a new and improved combination electric heating and temperature control arrangement which provides proportional control of temperature.

I have discovered that heretofore discarded PTC thermistors can provide closer temperature control than can the "switch" PTC devices. What I term a "switch PTC" is one that has a resistance ratio of 1000:1 over a selected temperature range, typically having a peak resistance of about ten thousand ohms only slightly above a switch temperature, at which the slope of the resistance-temperature curve undergoes a sudden increase. On the other hand, a PTC thermistor used in the illustrative embodiments of my invention, hereinafter referred to as a "proportional" PTC thermistor, typically will have a peak resistance of about six hundred ohms. Such a PTC permits proportional control of the power delivered to the heater, slowing down the increase of temperature as the desired temperature is approached. Therefore, temperature overshoot is minimized, as is temperature fluctuation that would occur if the temperature control device were switching on and off as by a thermostat. Furthermore, since the operation of such proportional PTC devices is in the region just above the switch temperature, rather than in the saturation plateau region, the self-heating problem with the switch PTC devices is eliminated by the invention.

In one embodiment of the invention, a portion of the heating element is shunted by a proportional PTC thermistor. When the temperature is low, the thermistor bypasses the portion of the heating element that it shunts. After the device has passed the thermistor switch temperature, the equivalent impedance of the arrangement will increase with the increasing resistance of the thermistor. This decreases the current flowing through the circuit as a whole, including both the shunted and unshunted portions of the heating element. The power output of the heating element thus decreases, thereby causing the temperature to level off. If the temperature starts to fall, the thermistor resistance decreases, causing more current to flow and the heating element puts out more heat.

BRIEF DESCRIPTION OF THE DRAWINGS

The invention will be described in conjunction with the accompanying drawings in which.

DETAILED DESCRIPTION OF THE ILLUSTRATIVE EMBODIMENTS

Figure 1:
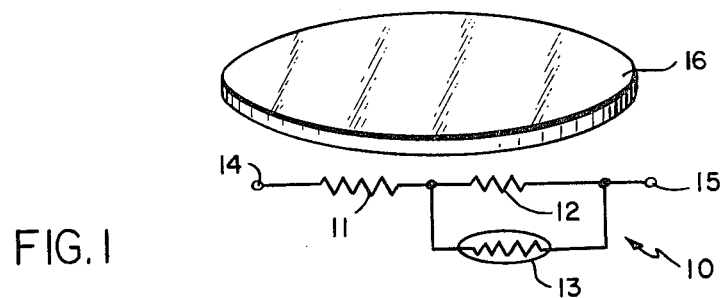
FIG. 1 is a circuit diagram of one embodiment of the automatic temperature control arrangement according to the invention.

FIG. 1 illustrates a temperature control circuit 10 according to the invention. Circuit 10 includes a first resistor 11 and a second resistor 12. A positive temperature coefficient (PTC) thermistor 13 is connected in parallel with resistor 12. Terminals 14 and 15 are to be connected to an external source of power, for example to AC electric lines (not shown). The resistors 11 and 12 are in close thermal conducting relationship with a plate 16 so that the plate is heated by the resistors when current from the AC lines passes through them. The thermistor 13 is similarly situated so that it senses the temperature of the plate and operates to control that temperature.

In operation, when power is first applied to the circuit, the resistance of thermistor 13 is low, effectively shorting resistor 12 and causing a relatively large current to flow, primarily through resistor 11 and PTC 13. The circuit thus generates heat at a rapid rate, with a corresponding increase in the temperature of the plate 16. As the temperature of the plate rises above the thermistor's switch or "activation" temperature, as described below, the resistance of thermistor 13 increases. Less current then flows through the thermistor and proportionately more flows through resistor 12. However, with the increased resistance of the thermistor, the resistance of the entire circuit increases and the current thus decreases. The rate of increase of the temperature of hot plate 16 therefore starts to decline and continues to decline until the temperature reaches a predetermined maximum.

If the temperature of the hotplate starts to fall, so does the temperature, and therefore the resistance, of thermistor 13. The current through the circuit therefore increases, resulting in an increase in the heat output thereof, and the desired temperature of hot plate 16 is thereby maintained. The circuit 10 thus maintains a close proportional control of temperature, with the resistance of thermistor 13 increasing as the temperature increases, thereby reducing the power to resistors 11 and 12, and decreasing as the temperature decreases, thereby increasing the power to resistors 11 and 12.

Figure 2:
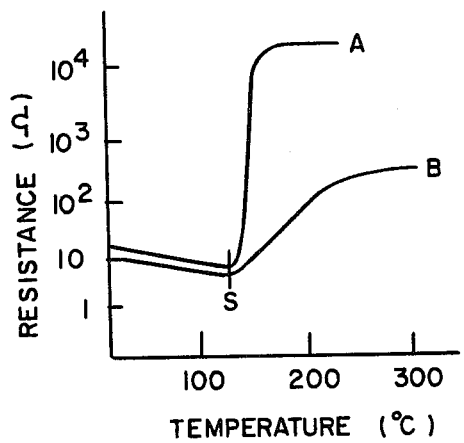
FIG. 2 is a graph showing the temperature versus resistance characteristic of a switch PTC thermistor and a proportional PTC thermistor.

FIG. 2 is a graph showing the resistance versus temperature for two PTC thermistors. The PTC thermistor having resistance temperature curve A is a switch PTC thermistor, and the device of curve B is a proportional PTC thermistor. In a PTC thermistor, at temperatures below the activation temperature, the resistance may decrease slightly with increasing temperature; however above the switch temperature (point S in FIG. 2), its resistance increases and in a switch PTC used in prior art circuits, this increase may be several factors of ten for a very few degrees increase in temperature. For a typical switch PTC, the resistance may increase from about 10 ohms at the switch temperature to on the order of ten thousand ohms a few degrees thereabove. The switch PTC in effect acts as a temperature-responsive switch. With the proportional PTC, on the other hand, the increase in resistance above the "activation" temperature is substantially less than for the switch PTC, to a resistance on the order of six hundred ohms, over the same temperature range. Furthermore, the rate of change of resistance against temperature for a proportional PTC is also substantially lower than for a switch PTC.

The PTC thermistor used in circuit 10 of FIG. 1 is one having curve B of FIG. 2. Since the PTC thermistor operates as a proportional temperature control instead of a switch, circuit 10 avoids the temperature swings typical of circuits which use switch PTC's. Furthermore, since the PTC thermistor 13 does not switch to a saturation plateau, but instead operates along its curve just above the activation temperature, the circuit avoids the situation in which the PTC switches to its saturation resistance and remains there through self-heating until the power to the device is switched off.

Resistors 11 and 12 may comprise a continuous heating element such as a length of nickel-chromium wire. Thermistor 13 then shunts the portion of the heating element represented by resistor 12.

The amount of control that the PTC has in the circuit depends on the relative resistances of resistors 11 and 12. Thus, if resistor 11 has a much greater resistance than resistor 12, the PTC 13 has much less control, that is, the PTC can cause less of a current variation through circuit 10, than if resistor 12 has a higher resistance. In one specific example, if resistor 11 has a resistance of four hundred ohms, and resistor 12 has a resistance of eight hundred ohms, and the PTC 13 varies from ten ohms to six hundred ohms, the power varies between thirty-five watts and about twenty watts.

Circuit 10, with the proportional PTC 13 shunting resistor 12, also has several other advantages. First, by the appropriate choice of resistors 11 and 12, one PTC thermistor size and design can be used in many different applications. Furthermore, circuit 10 permits a small PTC thermistor, that is, one able to dissipate only small amounts of heat, to control substantial amounts of power through resistors 11 and 12.

Circuit 10 does not prevent PTC thermistor 13 from self-heating. However, since the thermistor is a proportional thermistor, it is not driven to a saturation plateau and kept there by its self-heating. It maintains its ability to regulate current through the circuit.

Figure 3:
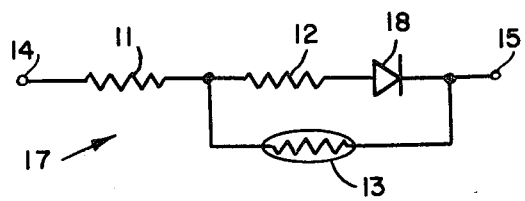
FIG. 3 is a circuit diagram of a second embodiment of the temperature control arrangement according to the invention.

FIG. 3 depicts a second embodiment of the invention including a circuit 17 comprising a heating element corresponding to resistors 11 and 12, and a diode 18 in series with the resistors. The PTC thermistor 13 shunts the series combination of diode 18 and resistor 12. The diode 18 can be connected in the circuit to pass current either towards terminal 15 or away from terminal 15.

Diode 18 is provided to decrease the power consumption by circuit 17 when the circuit is in the control mode, that is, when the temperature is above the PTC thermistor's activation temperature. The diode also gives the circuit a greater range of the temperatures under control. When the temperature is below the thermistor activation temperature, the circuit arrangement operates in the same way as circuit 10, since the resistor 12 and diode 18 branch is effectively bypassed by thermistor 13. Above the activation temperature, the power to resistors 11 and 12 is further decreased by the addition of diode 18, which reduces the current through resistor 12 to zero in one direction, and thereby reduces the current through resistor 11 during that part of the AC cycle. The reason for this is as follows: During the portion of the AC cycle in which current through resistor 12 is cut off, the portion of the current that passes through thermistor 13 still passes through resistor 11. However, this current during this half-cycle is lower than the current through resistor 11 in circuit 10 during the same half-cycle because the shunting resistor 12 is effectively cut off by diode 18, and the total resistance of this circuit is the sum of the resistances of resistor 11 and thermistor 13. Therefore, the amount of power dissipated, and hence the heat output, by circuit 17 is reduced from that of the circuit 10, above the thermistor's activation temperature.

Diode 18 may be replaced by any other conventional current-reducing circuit elements, such as, for example, resistors or the like added in series to resistor 12, or by increasing the resistance of resistor 12. A diode is used in the illustrative embodiment because, in manufacturing, the use of resistors, at least in small electrical appliances, would often be impractical. An additional resistance on the order of 1,000 ohms would be required. Either very fine wires would have to be used, or the resistors would have to be too large physically to be practical.

Figure 4:
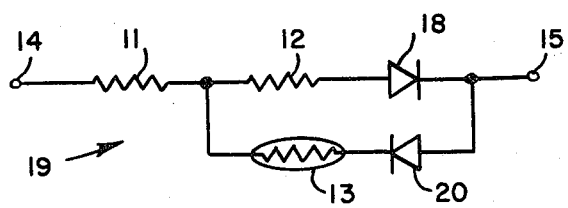
FIG. 4 is a circuit diagram of a third embodiment of a temperature control arrangement according to the invention.

A third embodiment, illustrated in FIG. 4, is similar to the embodiment shown in FIG. 3. It includes the terminals 14 and 15, the heating element represented by resistors 11 and 12, the PTC thermistor 13, and the diode 18. It also includes a second diode 20 in a shunt branch in series with thermistor 13. Thus, the series combination of heating element resistor 12 and diode 18 is shunted by the series combination of thermistor 13 and diode 20. Preferably, the diodes are connected to pass currents in opposite directions with respect to terminals 14 and 15. Diode 18 is connected to pass current towards terminal 15, diode 20 is directed to pass current towards terminal 14. Diode 20 further reduces the power through the heating element resistor 11, both below and above the activation temperature. Diode 18 continues to reduce power above the activation temperature. Diode 20, like diode 18, may also be replaced with a conventional resistance element, although the diode is preferred for the reasons given above.

Figure 5:
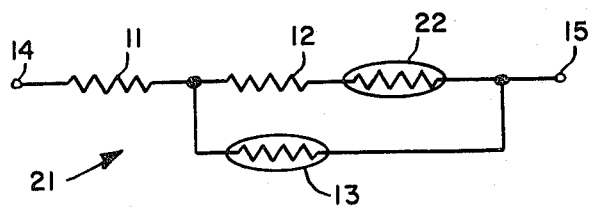
FIG. 5 is a circuit diagram of a fourth embodiment of a temperature control arrangement according to the invention.

The fourth embodiment of the invention, shown in FIG. 5, illustrates the use of a second thermistor in series with resistor 12. A circuit arrangement 21, similar to circuit 10 and including terminals 14 and 15, a heating element represented by resistors 11 and 12, a thermistor 13, and a second thermistor 22 in series with the heating element resistor 12. The series combination of resistor 12 and thermistor 22 is shunted by thermistor 13. Preferably, thermistor 22 has a higher activation temperature than thermistor 13 and also has a resistance versus temperature curve having a lower slope above its activation temperature. Both thermistors 13 and 22 are in thermal contact with heating plate 16. Below the activation temperature of thermistor 13, the circuit operates in a manner similar to circuit 10 of FIG. 1. Above the activation temperature of thermistor 13 and below the activation temperature thermistor 22, the circuit 21 also operates in a manner similar to circuit 10. Above the activation temperature of thermistor 22, the thermistor 22 provides additional control over the temperature provided by heating element resistors 11 and 12, against, for example, wide voltage swings. This makes the circuit particularly useful in circuits that have to be used, e.g., at both 120 or 240 volts.

Thus, it can be seen that the objects mentioned above and the objects made evident herein have been attained. The invention provides temperature control circuits using PTC thermistors, thermistors that have a low rate of resistance against temperature, to achieve a proportional control of temperature. The circuits avoid sharp changes in heat output as are normally experienced in temperature control arrangements using temperature-sensitive switches as exemplified by switch PTC devices or bimetallic switches. The invention also permits the use of a few standard PTC thermistors to provide temperature control in many applications.

What is claimed as new and desired to be secured by Letters Patent of the United States is:

1. An automatic temperature control circuit adapted to connect to a source of electrical current, said circuit comprising a resistive heating element and a thermistor having a positive temperature coefficient shunting at least a portion of said heating element, said thermistor further being characterized as having a base resistance below a selected temperature and a relatively low proportional rate of increase of resistance with increasing temperature over the entire temperature operating range above the selected temperature for automatically proportionally controlling the heat provided by said heating element when the temperature is above the selected temperature.

2. A circuit as defined in claim 1 further comprising a current limiting element connected in series with said heating element, said thermistor also shunting said current limiting elements.

3. A circuit as defined in claim 1 wherein said current limiting element comprises a diode means.

4. A circuit as defined in claim 2, further comprising a second current-limiting means connected in series with said thermistor, said series combination of said thermistor and said second current limiting means shunting said portion of said heating element.

5. A circuit as defined claim 4 wherein said second current-limiting means comprises a diode.

6. A circuit as defined in claim 5 wherein said first current limiting means comprises a diode, and said diodes are connected to conduct current in opposite directions.

7. A circuit as defined in claim 2 wherein said current limiting element comprises a second thermistor having a relatively low resistance below a second selected temperature, and a relatively low rate of increase of resistance with increasing temperature above the second selected temperature.

8. A circuit as defined in claim 7 wherein the second selected temperature is higher than first selected temperature, and the first thermistor has a higher rate of increase of resistance with increasing temperature than does said second thermistor.

* * * * *